(12) United States Patent
Adhikari et al.

(10) Patent No.: US 8,502,826 B2
(45) Date of Patent: Aug. 6, 2013

(54) MUSIC-VISUALIZER SYSTEM AND METHODS

(75) Inventors: Suranjit Adhikari, San Diego, CA (US); Eric Hsiao, San Diego, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 894 days.

(21) Appl. No.: 12/604,690

(22) Filed: Oct. 23, 2009

(65) Prior Publication Data

US 2011/0096073 A1    Apr. 28, 2011

(51) Int. Cl.
  *G06T 13/00* (2011.01)
  *G09G 5/00* (2006.01)

(52) U.S. Cl.
  USPC .......................................... 345/473; 345/653

(58) Field of Classification Search
  None
  See application file for complete search history.

(56) References Cited

U.S. PATENT DOCUMENTS

| | | | |
|---|---|---|---|
| 7,589,727 B2* | 9/2009 | Haeker | 345/440 |
| 2005/0190199 A1* | 9/2005 | Brown et al. | 345/600 |
| 2007/0157795 A1 | 7/2007 | Hung | |
| 2010/0011940 A1* | 1/2010 | Yoshikawa et al. | 84/612 |

OTHER PUBLICATIONS

"iTunes Help Screen", *"About iTunes"—iTunes 8.0.0.35.*
"Sound to Light Generator—World of Spectrum", http://www.worldofspectrum.org/infoseekid.cgi?id=0018300, originally retrieved Feb. 20, 2009, downloaded Nov. 10, 2009.

* cited by examiner

*Primary Examiner* — Kee M Tung
*Assistant Examiner* — Leon T Cain, II

(57) ABSTRACT

A music visualization system and methods involving a central processing unit capable of converting waveform data to geometry data, a graphics processing unit capable of recognizing and accepting the geometry data and rendering a plurality of graphical images, a custom shader software program being operable on the graphics processing unit, an embeddable platform being in electronic communication with the graphics processing unit, and an audiovisual display device in electronic communication with the graphics processing unit and the embeddable platform.

22 Claims, 4 Drawing Sheets

MUSIC-VISUALIZER SYSTEM AND METHODS

TECHNICAL FIELD

The present invention technically relates to systems and methods for visualizing music. More particularly, the present invention technically relates to systems and methods for visualizing music on a graphic display. Even more particularly, the present invention technically relates to systems and methods for visualizing music on a graphic display by way of an embeddable platform.

BACKGROUND ART

Music-visualizers have become an integral part of the music listening experience and a mainstay for most media devices. However, most related art music-visualizers use a repeating, or a semi-repeating, pattern of colors, movement, or shapes to provide an abstract interpretation of music being played. These visualizers usually typically run "canned" complex animation algorithms or "canned" mathematical formulas on a central processing unit (CPU), akin to what can be seen on computer screen-savers. This related art approach works well on powerful personal computer (PC) platforms having substantial processing power, but the related art approach is not amenable to low power embedded platforms.

Currently, the conversion from a sound signal to a video signal, in the related art, is performed by a central processing unit (CPU) of a personal computer (PC) due to the ease and flexibility of its programming environment and the ample processing power available on most modern PC platforms. Typically, these PC-based conversions use a traditional music-visualizer algorithm, involving analyzing the music, associating the analyzed data to a plurality of preset or "canned" animation parameters, and calculating a preset or "canned" visual representation of music using the plurality of preset animation parameters. In the related art, graphics processing units (GPUs) are typically used to "parallel" a three-dimensional drawing in general. Most related art applications use the graphics pipeline for solely rendering data at high frame rate.

Currently, the related art is not known to combine rendering with animation in a music-visualizer application for an embeddable platform, e.g., a television device, a set-top box device, and a hand-held device. Most of the related art music visualizers provide "canned" displays in relation to "canned" musical interpretations. Further, the current related art is not known to use shader-based methods for music visualization, especially with television or set-top box platforms. Therefore, a long-felt need is seen to exist in the related art for a real-time music-visualizer for displaying a real-time animated visual representation of music that directly corresponds to the characteristics of the music being played for embeddable platforms, such as television platforms or set-top box platforms, rather than merely relating to a preset or "canned" visual representation on a PC.

SUMMARY OF THE INVENTION

The present invention system and methods generally involves a graphics-processing unit with shader-based music-visualizer software for an embedded television platform or a set-top box platform. In addition, the present system and methods may provide the user with a virtual or simulated synesthetic audiovisual experience. Synesthesia is generally defined as a neurologically-based phenomenon in which stimulation of one sensory, or cognitive, pathway, e.g., sound, leads to automatic involuntary experiences in a second sensory, or cognitive, pathway, e.g., sight. Persons reporting such experiences are generally known as synesthetes who may possess an elevated level of cerebral cross-linking. With the present invention system and methods, general audiences, e.g., non-synesthetes will be also able to enjoy a unique audiovisual experience using any embedded platform, especially in relation to an embeddable platform, e.g., a television device, a set-top box device, and a hand-held device.

In one common form of synesthesia, e.g., visual motion-to-sound synesthesia, involves hearing sounds in response to visual motion and flicker. While cross-sensory metaphors, e.g., "loud shirt," "bitter wind," or "prickly laugh," are sometimes described as "synesthetic," true neurological synesthesia is involuntary. However, the present invention provides the user with a simulated synesthetic experience, wherein the user may literally visualize the music in real time, rather than merely watching "canned" interpretations of "canned" musical parameters. In another common form of synthesia, e.g., sound-to-color synesthesia, the phenomenon may be described as "something like fireworks," wherein a sound stimulus, such as a voice, music, and assorted environmental sounds, such as clattering dishes or dog barks, triggers the perception color and simple shapes that arise, move, and then fade when the sound stimulus ends. For some such synesthetes, the stimulus type is limited, e.g., to music only, or to even just a specific musical key. Yet, for other synesthetes, a wide variety of sounds triggers synesthesia. For some individuals, sound often provokes fluctuations in the perceived hue, brightness, scintillation, and directional movement in the visual perception. Some individuals see music on a mental "screen," e.g., as perceived to be in front of the face. This aspect of the phenomenon also includes the sound of music provoking the mental perception of waving lines, e.g., akin to "oscilloscope" configurations as well as lines that move in color, often metallic with height, width, and, even more interestingly, depth.

In order to enhance the musical experience for all users, the present invention music-visualizer system generally comprises a GPU having a custom shader software program, an embeddable platform in electronic communication with the GPU, and a display device in electronic communication with the GPU. The present method of music visualization generally comprises off-loading tasks from a CPU to a GPU for freeing capacity of the CPU for performing other mathematical tasks, e.g., calculating results using non-linear equations, thereby providing data for use by the GPU to display random images, musically-associated images, or soothing images for the user, converting waveform data to geometry data, e.g., triangular geometry data or trigonometric data to a form, corresponding to at least one geometry, e.g., to parameters that can manipulate the geometry and the position of a graphic visualization, that is acceptable to the GPU for rendering graphical images using a custom shader-based music-visualizer software, and combining the custom shader-based music-visualizer software with an embeddable platform, e.g., a television device, a set-top box device, and a hand-held device, thereby providing high-density resolution graphical images in visual patterns directly corresponding to musical patterns. The conversion from waveform data to a parameter that is specific to the GPU is significant in the present invention. These graphical images or visual representations are driven and synchronized by a change in loudness or frequency spectrum of the music that is ascertained by the CPU.

The custom shader software program uses algorithms that are capable of a plurality of processes, including displaying a random and soothing color pattern, wherein the pattern is defined by a plurality of random associations or a plurality of preset associations based on the measured frequency and converted wavelength of a musical sequence of at least one instrument in any given musical work as well as by measuring the frequency of a musical sequence of at least one instrument in any given musical work, such as a sound recording, converting the frequency to a wavelength, associating the converted wavelength to a corresponding color in the visible spectrum, and displaying the corresponding color. The present system is capable of contemporaneously playing music and displaying a visual representation of the music, comprising: a central processing unit capable of converting waveform data to geometry data; a graphics processing unit capable of recognizing and accepting the geometry data and rendering a plurality of graphical images; a custom shader software program being operable on the graphics processing unit; an embeddable platform being in electronic communication with the graphics processing unit; and an audiovisual display device in electronic communication with the graphics processing unit and the embeddable platform for displaying a music visualization.

The present invention generally encompasses a music visualization system for contemporaneously playing music and displaying a visual representation of the music. The system comprises: a central processing unit capable of converting waveform data to geometry data; a graphics processing unit capable of recognizing and accepting the geometry data and rendering a plurality of graphical images; a custom shader software program being operable on the graphics processing unit; an embeddable platform being in electronic communication with the graphics processing unit; and an audiovisual display device in electronic communication with the graphics processing unit and the embeddable platform.

The present invention also encompasses a method of fabricating the present system as well as a method of visualizing music. The music visualization method further includes measuring a frequency of each note in any given sequence of notes, converting the frequency into a wavelength, associating the wavelength with at least one visual parameter, such as a color in the visible spectrum, a position, and a shape, for the visualization, and displaying the at least one visual parameter, in real time, as the music is being played for enhancing a musical experience or for providing a simulated synesthetic experience. The graphical representation or musical visualization, e.g., the translation of raw audio data to the at least one visual parameter is also customizable by the programmer, or alternatively, by a user. The present invention also encompasses a method of using the present system. The use method generally comprises providing music to a device having an embeddable platform, running a music visualizer, thereby providing a music visualization in real time, listening to the music, and watching the music visualization, wherein the music providing step comprises using a technique, such as loading, uploading, downloading, and streaming.

Advantages of the present invention include, but are not limited to, providing a simulated synesthetic experience, enhancing the musical listening experience, providing interesting real-time audiovisual entertainment, and facilitating an audiovisual experience by merging the animation calculation into the rendering pipeline, thereby off-loading tasks otherwise performed by a CPU, onto a GPU for handling the bulk of the visualization processing, and thereby providing sufficient capacity in the CPU for extensive decoding of the music and for performing any other tasks. Further advantages of the present invention include the audio data, calculated from the audio signal, being directly and immediately processable by the GPU, the actual amplitude data being useable as a controlling parameter since the amplitude data is usually a floating point number between 0.0 and 1.0, and the movement and color of the visualizer effect being accurately represented in the visual representation.

BRIEF DESCRIPTION OF THE DRAWING(S)

For a better understanding of the present invention, reference is made to the below-referenced accompanying Drawing(s). Reference numbers refer to the same or equivalent parts of the present invention throughout the several figures of the Drawing(s).

MODE(S) FOR CARRYING-OUT THE INVENTION

Figure 1:
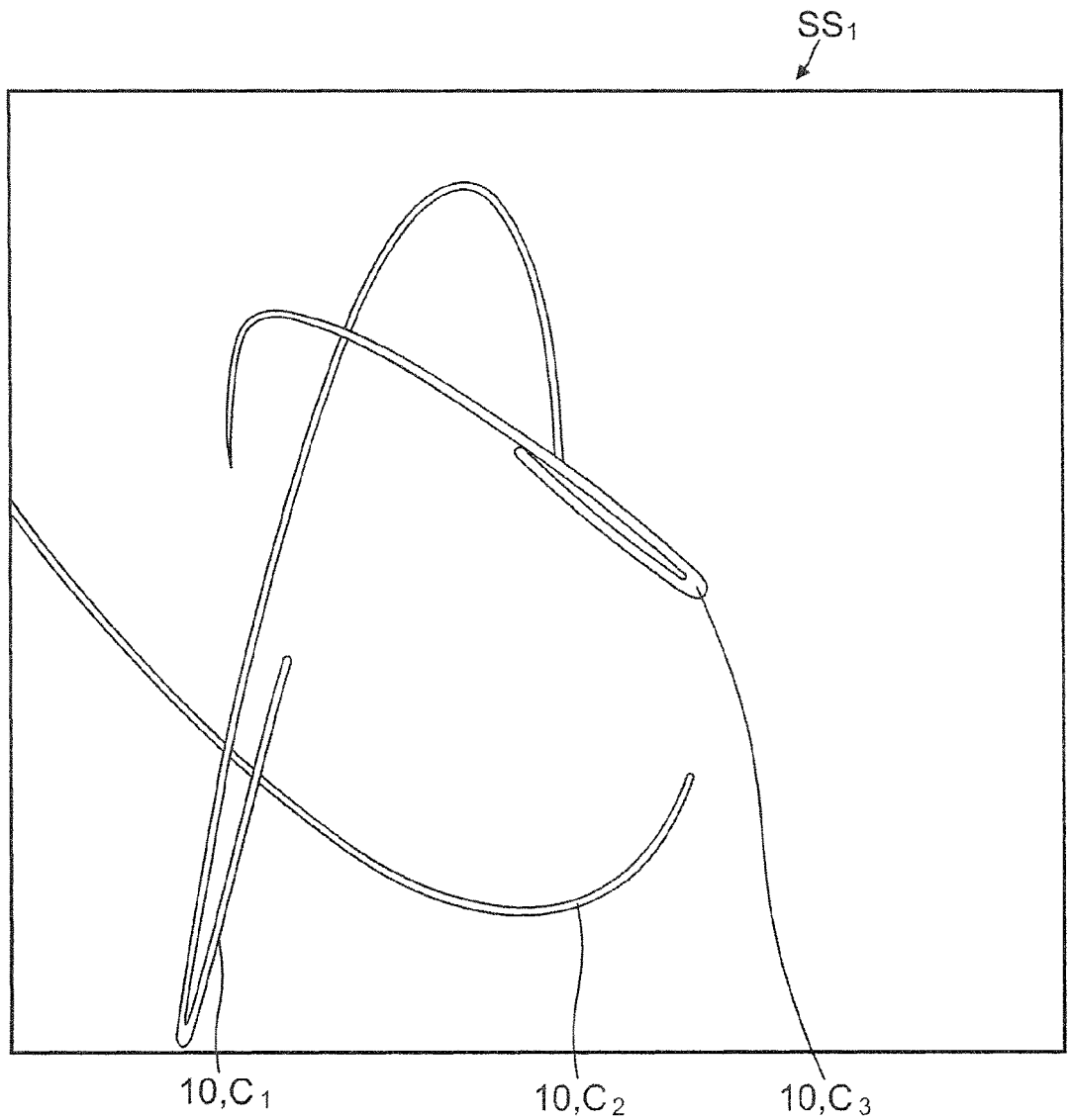
FIG. 1 is a screen shot of a display generated by a music visualizer system, showing a visual representation comprising a plurality of moving linear elements having a corresponding plurality of colors, by example only, according to an embodiment of the present invention.

FIG. 1, illustrates, in a screen shot $SS_1$, a display generated by a music visualizer system, showing a visual representation comprising a plurality of moving linear elements 10 having a corresponding plurality of colors $C_1, C_2, C_3$, by example only, according to an embodiment of the present invention. The present system utilizes at least one custom shader software program for both rendering as well as animation calculations. Since music visualization tasks for embedded platforms are CPU-intensive, low power CPUs are not equipped to decode music as well as perform complex animations simultaneously as would otherwise be required for more interesting accurate real-time music visualizations. By merging the animation calculation into the rendering pipeline, the present system off-loads tasks, otherwise performed by a CPU, onto the GPU for handling the bulk of the visualization processing, thereby providing sufficient capacity in the CPU for extensive decoding of the music. By off-loading the animation processing tasks to the GPU, the shaders of the custom shader software program can be used solely to support the music-visualizer in displaying animated visual patterns (random or non-preset) that directly correspond to musical patterns in the present invention. The patterns may also optionally comprise a plurality of preset shapes. All the calculations are also off-loaded by the GPU to the graphics core, wherein an "OpenGL ES 2.0" shading language is subsequently applied to calculate a series of results, e.g., sinusoidal equations for generating smooth animations. As such, the CPU has increased capacity for performing many other activities.

Still referring to FIG. 1, the implementation of a graphics pipeline involves the shading language "OpenGL ES 2.0," thereby allowing flexibility in using additional hardware for any number of applications. By example only, a plurality of such music-visualizers, using the OpenGL ES 2.0 shading language, can be implemented on a television platform. These shaders operate on a set of triangles created by the software, determine vertex information, and subsequently feed the vertex information to a vertex shader. The vertex shader recognizes each individual vertex and transforms it using a set of operations, e.g., a trigonometric function as a transformation matrix. The vertices are then passed to a pixel shader that specifies the manner in which an initial representation is to be colored. Subsequently, a plurality of fading and alpha-blending effects are applied to the initial representation. Further, the present invention system comprises a particle system that is controllable by a limited set of parameters being fed from the CPU. The only task being performed by the CPU, at this stage, is setting the triangle setup and the visualization parameters that are directly extracted from the audio data, thereby allowing parallel processing of the music signals as well as the visualization effect for facilitating the real-time display. In the present invention, an embeddable platform, e.g., a television device, a set-top box device, and a hand-held device, may comprise three-dimensional GPU semiconductor chips for facilitating the music-visualizers. The present system and methods may be used with any other embeddable platform.

Figure 2:
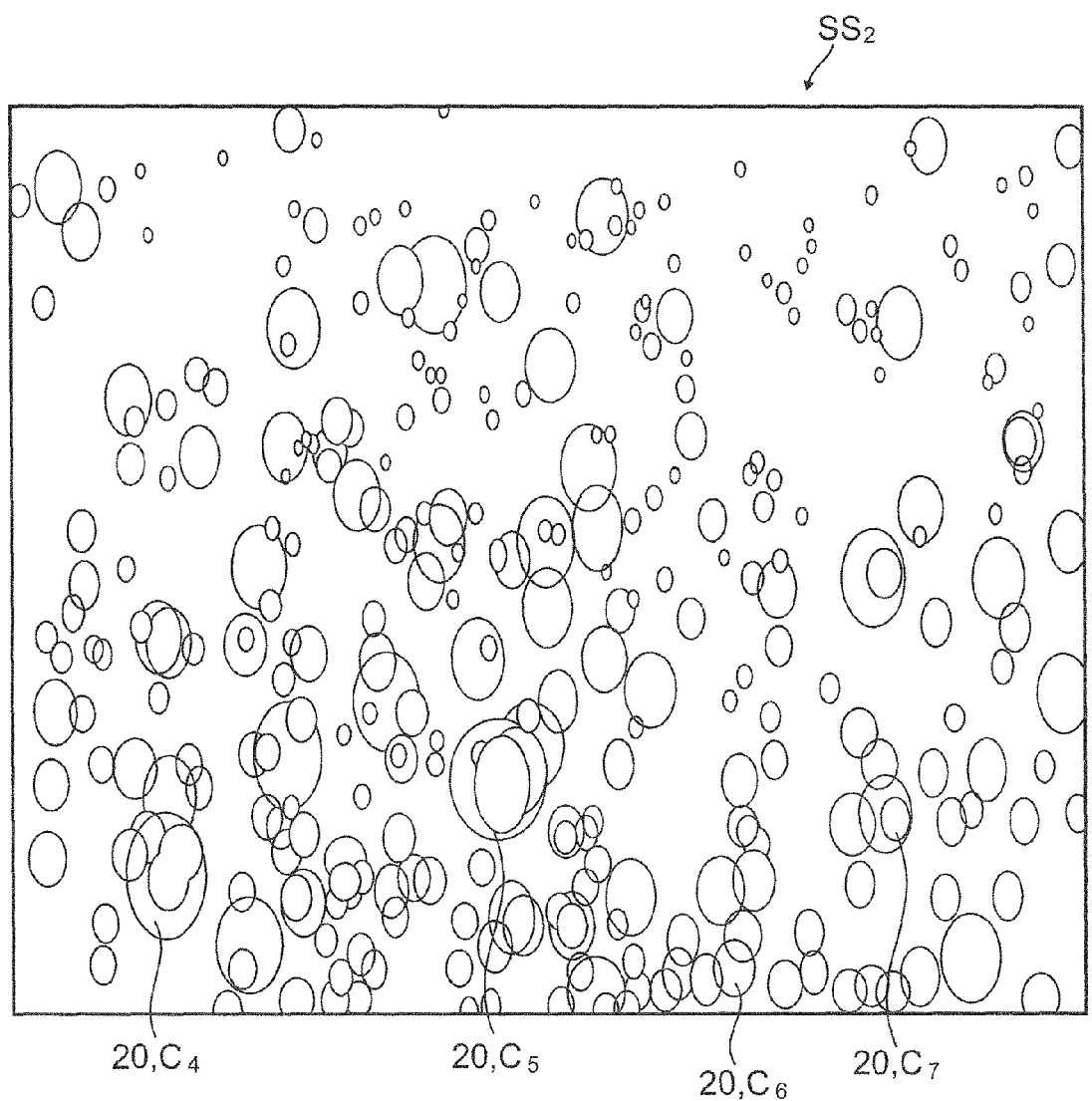
FIG. 2 is a screen shot of a display generated by a music visualizer system, showing a visual representation comprising a plurality of moving spot elements having a corresponding plurality of colors, by example only, according to another embodiment of the present invention.

FIG. 2 illustrates, in a screen shot $SS_2$, a display generated by a music visualizer system, showing a visual representation comprising a plurality of moving spot elements 20 having a corresponding plurality of colors $C_4$, $C_5$, $C_6$, $C_7$, by example only, according to another embodiment of the present invention. The present invention visualization techniques range in complexity from a simple display, e.g., a simulation of an oscilloscope display, to an elaborate display, often including a plurality of composite effects. The change or changes in the music's loudness and frequency are among the properties used as input to create and synchronize the corresponding visualization, in contrast to many related art visualization programs that do not have any actual correspondence or synchronization to loudness and frequency of the music. Usually, all of this work is performed by the CPU due to the ease of programming as well as ability to easily translate the frequency as well as loudness data into visual effect parameters. The present system and methods comprise a functional space conversion from the frequency and amplitude space of an audio signal to a multivariate functional space of a defined visual space, thereby providing data for producing a final visualization effect, e.g., a real-time accurately corresponding visual effect.

Figure 3:
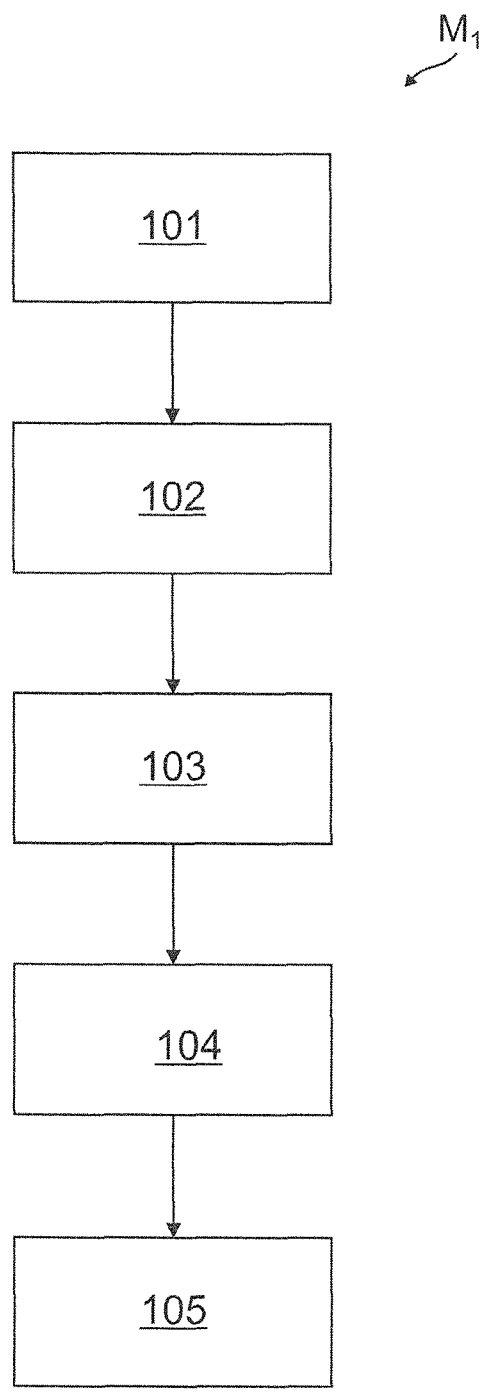
FIG. 3 is a flowchart of a method of fabricating a music visualizer system, by example only, according to an embodiment of the present invention.

FIG. 3 illustrates, in a flowchart, a method $M_1$ of fabricating a music visualization system, by example only, according to an embodiment of the present invention. The method $M_1$ of fabricating a music visualization system, comprising: providing a central processing unit capable of converting waveform data to geometry data, as indicated by block 101; providing a graphics processing unit capable of recognizing and accepting the geometry data and rendering a plurality of graphical images, as indicated by block 102 providing a shader software program being operable on the graphics processing unit, as indicated by block 103; providing an embeddable platform being in electronic communication with the graphics processing unit, as indicated by block 104; and providing an audio-visual display device in electronic communication with the graphics processing unit and the embeddable platform, as indicated by block 105.

The method $M_1$ further comprises the steps of: off-loading at least one task from the central processing unit to the graphics processing unit for freeing capacity of the central processing unit to perform at least one mathematical task; converting waveform data by the central processing unit to geometry data that is acceptable to the graphics processing unit for rendering graphical images using the custom shader software program; measuring a frequency of each note in any given sequence of notes; converting the frequency into a wavelength; associating the wavelength with a color in the visible spectrum; displaying the color in real time as the music is being played, thereby providing a simulated synesthetic experience; passing each vertex to a pixel shader that specifies a manner in which an initial representation is to be colored; and applying a plurality of fading and alpha-blending effects to the initial representation.

The method $M_1$ also involves the following aspects. The off-loading step comprises calculating at least one result using at least one non-linear equation as the at least one other mathematical task, thereby providing compatible data for use by the graphics processing unit to display a music visualization. The music visualization comprises at least one feature, such as a random image and a musically-associated image, and a soothing image. The custom shader software program providing step comprises providing the custom shader software program as being capable of performing a plurality of processes for providing a music visualization. The plurality of processes comprises at least one technique, such as providing a plurality of preset shape and color associations based on a measured frequency and a converted wavelength of a musical sequence of at least one instrument in any given musical work; and providing a plurality of random shape and color associations based on a measured frequency of a musical sequence of at least one instrument in any given musical work and a converted wavelength corresponding to a color in a visible spectrum and displaying the corresponding shape and color.

The method $M_1$ further involves several more of the following aspects. The embeddable platform providing step comprises providing an element, such as a television platform, a set-top box platform, and a hand-held device platform. The embeddable platform providing step comprises providing at least one three-dimensional graphics processing unit semiconductor chip for facilitating the music visualization. The custom shader software program providing step comprises the steps of providing the custom shader software program being operable on a set of triangles as an initial geometry, determining vertex information and feeding the vertex information to a vertex shader. The vertex shader recognizes each individual vertex and transforms it using a set of operations comprising using a trigonometric function as a transformation matrix. The music visualization comprises at least one feature selected from a group consisting essentially of a simple display, a simulation of an oscilloscope display, an elaborate display, and a display having a plurality of composite effects. The audiovisual display device providing step comprises providing the music visualization as being driven and synchronized by a change in loudness and frequency spectrum of the music that is ascertained by the central processing unit. The central processing unit providing step comprises converting frequency and amplitude space of an audio signal to a multivariate functional space, thereby providing data for producing the music visualization effect in real time; and the converting step comprises defining a set of equations that will represent at least one movement and at least one color behavior, wherein the defining step comprises implementing a set of adaptable overlapping trigonometric functions, thereby defining a set of coordinate data corresponding to at least one orthogonal position associated with at least one vertex, the at least one orthogonal position comprising at least one position in a direction selected from a group consisting essentially of an x-direction, a y-direction, and a z-direction, wherein the set of coordinate data comprises at least one coordinate selected from a group consisting essentially of an x-coordinate, a y-coordinate, and a z-coordinate, wherein x=sin θ*time; y=cos θ*time; and z=cos θ*sin θ*time, and wherein θ=an angle, e.g., an amplitude angle.

The present invention also encompasses a method $M_2$ of visualizing music (See FIG. 4) which further completes the data conversion, via the GPU, and uses solely the converted data to drive the visual effect. The only function of the CPU is to analyze the audio signal; and the remainder of the work is off-loaded to the GPU, including the actual animation of the effects which is not traditionally performed by the GPU. Noteworthy is that the GPU is not readily compatible with the every data type or every available function. Therefore, an additional functional algorithm is applied by the present custom shader software program that allows the GPU to perceive the incoming data as being readable and compatible.

Figure 4:
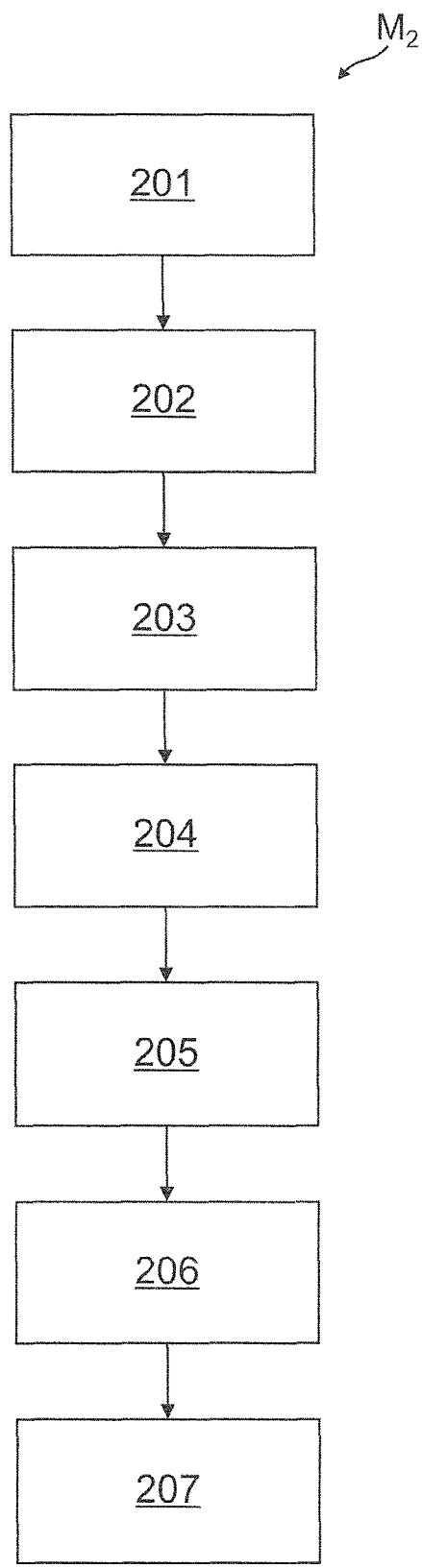
FIG. 4 is a flowchart of a method of contemporaneously visualizing music while playing music, by example only, according to an embodiment of the present invention.

FIG. 4 illustrates, in a flow chart, a method $M_2$ of contemporaneously visualizing music while playing music, in accordance with an embodiment of the present invention. The method $M_2$ comprises providing a central processing unit capable of converting waveform data to geometry data, as indicated by block 201; providing a graphics processing unit capable of recognizing and accepting the geometry data and rendering a plurality of graphical images, as indicated by block 202; providing a shader software program being operable on the graphics processing unit, as indicated by block 203; providing an interfacing device having an embeddable platform being in electronic communication with the graphics processing unit, as indicated by block 204; providing an audiovisual display device in electronic communication with the graphics processing unit and the embeddable platform, as indicated by block 205; providing music to the interfacing device, as indicated by block 206; and running the interfacing device, as indicated by block 207, thereby providing a music visualization in real time to the audiovisual display device, wherein the music providing step comprises using at least one technique selected from a group consisting essentially of loading the music, uploading the music, downloading the music, and streaming the music.

In addition, the method $M_2$ includes using the GPU for a non-graphic application, e.g., to convert data extracted from an audio signal to an accurately corresponding visual representation as displayed by the GPU in real time. In the present music visualization method, the step of converting at least one audio signal to at least one video signal in real time, e.g., by converting frequency data into wavelength data, by way of a music-visualizer, generally comprises defining a set of equations that will represent at least one movement and at least one color behavior of the visualizer, wherein the defining step comprises implementing a set of adaptable overlapping trigonometric functions, e.g., a stack of rectangles, thereby defining a set of coordinate data corresponding to at least one orthogonal position, e.g., in the x-direction, in the y-direction, and in the z-direction, associated with at least one vertex, wherein x=sin θ*time; y=cos θ*time; and z=cos θ*sin θ*time, and wherein θ=an angle, e.g., an amplitude angle.

The present music visualization method $M_2$ further comprises the steps of repeating the defining step at least once, thereby providing a real-time repositioning of the at least one vertex; updating the real-time repositioning of the at least one vertex, wherein the updating step comprises replacing an old set of coordinate data with a new set of coordinate data, i.e., in real time as the music is being played, thereby providing a set of updated coordinate data; transmitting the set of updated coordinate data to a shader software program for ascertaining whether the real-time repositioning of the at least one vertex is accurate in relation to the at least one audio signal, thereby providing a set of confirmed coordinate data; defining at least one geometry corresponding to the set of adaptable overlapping trigonometric functions; visually moving, in real-time, the at least one geometry in relation to the set of confirmed coordinate data; and defining at least one color and α-value as a function of the z-coordinate of each at least one vertex, wherein α is a function of cos θ*sin θ*time. Thus, as the value of the z-coordinate increases, the α-value or "alpha-channel" value, of an object, e.g., a vertex, decreases.

Referring back to FIGS. 1 and 2, the Red-Green-Blue-Alpha (RGBA) values can be either pre-calculated or dynamically calculated based on the audio analysis in the present method $M_2$. While RGBA is sometimes described as a "color space," RGBA is actually a use of the Red-Green-Blue (RGB) color model with extra information. A color may be RGB and may belong to any RGB color space, but an integral alpha-value (α-value) enables alpha-blending and alpha-compositing. An alpha-channel is normally used as an opacity channel. For instance, if a pixel has a value of 0% in its alpha channel, it is fully transparent and, thus, invisible, whereas a value of 100% in the alpha channel gives a fully opaque pixel, such as in traditional digital images. Values between 0% and 100% make it possible for pixels to display through a transparent or translucent background, e.g., a glass or a polymer, an effect not possible with simple binary (transparent or opaque) transparency. This feature facilitates image compositing. Alpha-channel values can be expressed as a percentage, an integer, or a real number between 0 and 1 as can RGB parameters.

With respect to the shader software program being run on the GPU, the input parameters comprise a time value, t, being transmitted from the CPU and defining a given time as well as a time lapse and an angle, θ, being transmitted from the CPU and defining the amplitude of a function, the function being optionally predefined. As mentioned, supra, traditionally GPU's are used to only add effect and advanced rendering calculation to a graphical scene in the related art. However, the present music visualization method comprises converting at least one audio signal to at least one audio parameter value that is compatible with the GPU, thereby facilitating directly using the at least one audio parameter value to drive the on-screen visualization effect. In the related art, GPUs typically do not accept waveform data, because they expect the transmission of pixel data or vertex data. In the present invention, waveform data from the audio data is converted into numbers or into trigonometric data using the custom shader software program. Further, the present music visualization method further encompasses programmatically using the foregoing compatible conversion of audio data to model a more non-linear equation, such as the Lorentz attractors on the GPU, and then for providing input parameters to the shader software program to effect a truly random and unique audiovisual experience, e.g., a simulated synesthetic experience, each and every time the music visualization is displayed.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, that various changes and modifications in form, material, and fabrication material detail may be made, without departing from the spirit and scope of the invention as set forth in the appended claims, should be readily apparent to those of ordinary skill in the art. No claim herein is to be construed under the provisions of 35 U.S.C. §112, sixth paragraph, unless the element is expressly recited using the phrase "means for."

INDUSTRIAL APPLICABILITY

The present invention industrially applies to systems and methods for visualizing music. More particularly, the present invention industrially applies to systems and methods for visualizing music on a graphic display. Even more particularly, the present invention industrially applies to systems and methods for visualizing music on a graphic display by way of an embeddable platform.

What is claimed:

1. A system for contemporaneously playing music and displaying a visual representation of the music, the system comprising:
    a central processing unit operable to convert waveform data to geometry data, wherein the conversion comprises defining a set of equations that represents one or more movements and one or more color behaviors, wherein defining the set of equations comprises implementing a set of adaptable overlapping trigonometric functions;
    a graphics processing unit operable to recognize and accept the geometry data from the central processing unit and render a plurality of graphical images;
    a custom shader software program being operable on the graphics processing unit, wherein a vertex shader transforms each of one or more vertices using a trigonometric function as a transformation matrix;
    an embeddable platform being in electronic communication with the graphics processing unit; and
    an audiovisual display device in electronic communication with the graphics processing unit and the embeddable platform for displaying the visual representation of the music.

2. The system of claim 1, further comprising a particle system controllable by a limited set of parameters being fed from the central processing unit.

3. The system of claim 1, wherein the embeddable platform comprises one or more of: an embedded television platform, a set-top box, and/or a hand-held device.

4. The system of claim 1, wherein the custom shader software program comprises an OpenGL ES shading language.

5. The system of claim 1, further comprising a particle system controllable by a limited set of parameters being fed from the central processing unit,
    wherein the embeddable platform comprises one or more of: an embedded television platform, a set-top box, and/or a hand-held device, and
    wherein the custom shader software program comprises an OpenGL ES shading language.

6. A method of contemporaneously playing music and displaying a visual representation of the music, the method comprising:
    converting waveform data to geometry data using a central processing unit;
    recognizing and accepting the geometry data from the central processing unit and rendering a plurality of graphical images using a graphics processing unit;
    executing a custom shader software program on the graphics processing unit;
    displaying the visual representation of the music by an audiovisual display device in electronic communication with the graphics processing unit;
    measuring a frequency of a note in any given sequence of notes;
    converting the frequency into a wavelength;
    associating the wavelength with a color in a visible spectrum; and
    displaying the color in real time as the music is being played, thereby providing a simulated synesthetic experience,
    wherein converting the frequency comprises defining a set of equations that represents one or more movements and one or more color behaviors,
    wherein defining the equations set comprises implementing a set of adaptable overlapping trigonometric functions, thereby defining a set of coordinate data corresponding to one or more orthogonal positions associated with one or more vertices, the one or more orthogonal positions comprising one or more positions in a direction comprising one or more of: an x-direction, a y-direction, and a z-direction, wherein the set of coordinate data comprises one or more of: an x-coordinate, a y-coordinate, and a z-coordinate,
    wherein $x=\sin\theta*time$; $y=\cos\theta*time$; and $z=\cos\theta*\sin\theta*time$, and
    wherein $\theta=$an amplitude angle.

7. The method of claim 6, further comprising off-loading one or more tasks from the central processing unit to the graphics processing unit for freeing capacity of the central processing unit to perform one or more mathematical tasks.

8. The method of claim 7,
    wherein the off-loading comprises calculating one or more results using one or more non-linear equations as the one or more other mathematical tasks, thereby providing compatible data for use by the graphics processing unit for displaying the visual representation of the music, and
    wherein the visual representation of the music comprises one or more of: a random image and a musically-associated image, and/or a soothing Image.

9. The method of claim 6, further comprising converting waveform data by the central processing unit to geometry data that is acceptable to the graphics processing unit for rendering the plurality of graphical images using the custom shader software program.

10. The method of claim 6, wherein the custom shader software program is operable to perform a plurality of processes for providing the visual representation of the music.

11. The method of claim 10, wherein the plurality of processes comprises one or more of:
    providing a plurality of preset shape associations and a plurality of preset color associations based on a measured frequency and a converted wavelength of a note in a musical sequence of one or more instruments in any given musical work;

providing a plurality of random shape associations and a plurality of random color associations based on the measured frequency and a converted wavelength corresponding to a color in a visible spectrum; and
displaying a corresponding shape and a corresponding color.

12. The method of claim 6, wherein an embeddable platform is in electronic communication with the graphics processing unit, wherein the embeddable platform comprises one or more of: an embedded television platform, a set-top box platform, and/or a hand-held device platform.

13. The method of claim 12, wherein the embeddable platform comprises one or more three-dimensional graphics processing unit semiconductor chips for facilitating the visual representation of the music.

14. The method of claim 6,
wherein the custom shader software program is operable on a set of triangles as an initial geometry, thereby determining vertex information of one or more vertices and feeding the vertex information to a vertex shader, and
wherein the vertex shader recognizes and transforms each of the one or more vertices it using a set of operations comprising a trigonometric function as a transformation matrix.

15. The method of claim 14, further comprising passing the each of the one or more vertices to a pixel shader that specifies a manner in which an initial representation is to be colored.

16. The method of claim 15, further comprising applying a plurality of fading and alpha-blending effects to the initial representation.

17. The method of claim 6, wherein the visual representation of the music comprises one or more of: a simple display, a simulation of an oscilloscope display, an elaborate display, and/or a display having a plurality of composite effects.

18. The method of claim 6, wherein the visual representation of the music is driven and synchronized by a change in loudness and a change in frequency spectrum of the music that is ascertained by the central processing unit.

19. The method of claim 6, further comprising converting frequency and amplitude space of an audio signal to a multivariate functional space, thereby providing data for producing the visual representation of the music in real time.

20. The method of claim 6, further comprising:
repeating the defining step at least once, thereby providing a real-time repositioning of the one or more vertices;
updating the real-time repositioning of the one or more vertices, wherein the updating comprises replacing an old set of coordinate data with a new set of coordinate data, thereby providing a set of updated coordinate data;
transmitting the set of updated coordinate data to the custom shader software program for ascertaining whether the real-time repositioning of the one or more vertices is accurate in relation to one or more audio signals, thereby providing a set of confirmed coordinate data;
defining one or more geometries corresponding to the set of adaptable overlapping trigonometric functions;
visually moving, in real-time, the one or more geometries in relation to the set of confirmed coordinate data; and
defining one or more colors and one or more α-values as a function of the z-coordinate of the one or more vertices, wherein α comprises a function of $\cos\theta * \sin\theta * time$.

21. The method of claim 6, further comprising providing music to an interfacing device having an embeddable platform, wherein providing the music comprises using one or more of: loading the music, uploading the music, downloading the music, and/or streaming the music.

22. A method of fabricating a system for contemporaneously playing music and displaying a visual representation of the music, comprising:
providing a central processing unit capable of converting waveform data to geometry data;
providing a graphics processing unit capable of recognizing and accepting the geometry data and rendering a plurality of graphical images;
providing a custom shader software program being operable on the graphics processing unit;
providing an embeddable platform being in electronic communication with the graphics processing unit;
providing an audiovisual display device in electronic communication with the graphics processing unit and the embeddable platform for displaying a music visualization;
off-loading at least one task from the central processing unit to the graphics processing unit for freeing capacity of the central processing unit to perform at least one mathematical task;
converting waveform data by the central processing unit to geometry data that is acceptable to the graphics processing unit for rendering graphical images using the custom shader software program;
measuring a frequency of a note in any given sequence of notes;
converting the frequency into a wavelength;
associating the wavelength with a color in a visible spectrum;
displaying the color in real time as the music is being played, thereby providing a simulated synesthetic experience;
passing each vertex to a pixel shader that specifies a manner in which an initial representation is to be colored; and
applying a plurality of fading effects and a plurality of alpha-blending effects to the initial representation,
wherein the off-loading step comprises calculating at least one result using at least one non-linear equation as at least one other mathematical task, thereby providing compatible data for use by the graphics processing unit for displaying the music visualization,
wherein the music visualization comprises at least one feature selected from a group consisting essentially of a random image and a musically-associated image, and a soothing image;
wherein the custom shader software program providing step comprises providing the custom shader software program as being capable of performing a plurality of processes for providing the music visualization,
wherein the plurality of processes comprises at least one technique selected from a group consisting essentially of:
providing a plurality of preset shape associations and a plurality of color associations based on a measured frequency and a converted wavelength of a musical sequence of at least one instrument in any given musical work;
providing a plurality of random shape associations and a plurality of color associations based on a measured frequency of a musical sequence of at least one instrument in any given musical work and on a converted wavelength corresponding to a color in a visible spectrum; and
displaying a corresponding shape and a corresponding color,
wherein the embeddable platform providing step comprises providing at least one element selected from a group consisting essentially of a embedded television platform, a set-top box platform, and a hand-held device platform, wherein the embeddable platform providing step comprises providing at least one three dimensional graphics processing unit semiconductor chip for facilitating the music visualization, wherein the custom shader software program providing step comprises providing the custom shader software program being operable on a set of triangles as an initial geometry, thereby determining vertex information of at least one vertex and feeding the vertex information to a vertex shader, wherein the vertex shader recognizes each at least one vertex and transforms it using a set of operations comprising using a trigonometric function as a transformation matrix, wherein the music visualization comprises at least one feature selected from a group consisting essentially of a simple display, a simulation of an oscilloscope display, an elaborate display, and a display having a plurality of composite effects, wherein the audiovisual display device providing step comprises providing the music visualization as being driven and synchronized by a change in loudness and a change in frequency spectrum of the music that is ascertained by the central processing unit, wherein the central processing unit providing step comprises converting frequency and amplitude space of an audio signal to a multivariate functional space, thereby providing data for producing the music visualization in real time, wherein the converting step comprises defining a set of equations that will represent at least one movement and at least one color behavior, wherein the defining step comprises implementing a set of adaptable overlapping trigonometric functions, thereby defining a set of coordinate data corresponding to at least one orthogonal position associated with at least one vertex, the at least one orthogonal position comprising at least one position in a direction selected from a group consisting essentially of an x-direction, a y-direction, and a z-direction, wherein the set of coordinate data comprises at least one coordinate selected from a group consisting essentially of an x-coordinate, a y-coordinate, and a z-coordinate, wherein $x = \sin \theta * time$; $y = \cos \theta * time$; and $z = \cos \theta * \sin \theta * time$, and wherein $\theta =$ an amplitude angle.

* * * * *